United States Patent
Boss et al.

(10) Patent No.: US 7,653,576 B2
(45) Date of Patent: Jan. 26, 2010

(54) METHOD FOR PRICING ITEMS

(75) Inventors: Gregory Jensen Boss, American Fork, UT (US); Rick Allen Hamilton, II, Charlottesville, VA (US); William Louis Moraca, Jr., McLean, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 11/461,474

(22) Filed: Aug. 1, 2006

(65) Prior Publication Data

US 2008/0033831 A1 Feb. 7, 2008

(51) Int. Cl.
*G06Q 30/00* (2006.01)

(52) U.S. Cl. ......................................... 705/26
(58) Field of Classification Search .................. 705/26, 705/27
See application file for complete search history.

(56) References Cited

U.S. PATENT DOCUMENTS

| | | | |
|---|---|---|---|
| 6,129,274 A | 10/2000 | Suzuki | |
| 6,317,718 B1 | 11/2001 | Fano | |
| 6,434,536 B1 * | 8/2002 | Geiger | 705/37 |
| 6,435,406 B1 | 8/2002 | Pentel | |
| 2002/0115449 A1 | 8/2002 | Allen | |
| 2004/0002897 A1 | 1/2004 | Vishik | |
| 2006/0149618 A1 * | 7/2006 | Balin et al. | 705/14 |
| 2006/0294367 A1 * | 12/2006 | Yoshioka | 713/156 |
| 2007/0130090 A1 * | 6/2007 | Staib et al. | 705/400 |
| 2007/0136140 A1 * | 6/2007 | Smith, Jr. | 705/26 |

OTHER PUBLICATIONS

Richard Bray, "Reverse auctions going full speed ahead", Summit. Ottawa: Mar. 2003. vol. 6, Iss. 2; p. 2, 1 pgs http://proquest.umi.com/pqdweb?did=321930881&sid=2&Fmt=4&clientId=19649&RQT=309&VName=PQD.*

* cited by examiner

*Primary Examiner*—Mila Airapetian
(74) *Attorney, Agent, or Firm*—Yee & Associates, P.C.; William H. Steinberg

(57) ABSTRACT

A computer implemented method, apparatus, and computer usable program code are provided for real time pricing of items by a customer located in a store. A customer sends a request to price an item using a mobile device to a Web service server. The Web service server identifies the customer's location and queries a set of information sources for prices from several vendors within a selected distance of the customer's location. The Web service server may include price information for items comparable to the item requested by the customer. The Web service server applies competitive rules defined by a vendor to determine pricing for the item from that vendor. The Web service server may also create special price quotes based on the verified location and identity of the customer. The Web service server sends the result to the customer and enables a real time purchase from the result displayed on the mobile device.

15 Claims, 8 Drawing Sheets

METHOD FOR PRICING ITEMS

BACKGROUND OF THE INVENTION

1. Field of the Invention

The present invention relates generally to an improved data processing system, and in particular, to a computer implemented method, apparatus, and computer usable program code for pricing items in a retail environment. In particular, the present invention is directed to a computer implemented method, apparatus, and computer usable program code for generating competitive targeted pricing and location sensitive retail pricing and inventory comparison.

2. Description of the Related Art

A customer, looking to buy an item, such as a product or a service, has different methods available for price comparison of the item. For example, retailers provide pricing information to customers through advertising using radio, television, magazines, newspapers, email messages, and websites media. Such pricing information from one retailer is readily compared with similar information provided by other retailers. Sometimes, some retailers directly or indirectly compare their prices for certain items with competing items.

A customer may find a desired item among the information dispersed and compared by a retailer. Alternatively, a customer may utilize services that do the comparison for the customer. Online services on the Internet provide comparative pricing for a item from several retailers. In this manner, the customer can select from whom to buy the item to obtain the lowest price.

Furthermore, discounts may be offered by a retailer to all customers. These discounts may further adjust the retailer's price for an item for all customers. Some retailers offer preferred customer discounts and other promotions. These offers may further adjust the price of the item for select customers. Some comparison shopping services, especially the online services, afford the customers the ability to perform comparison shopping using a computer at home.

However, the presently available retailing systems and comparison shopping systems suffer from some limitations. When a customer is shopping in a physical store, these methods do not provide the necessary information for comparison shopping around the customer's present location. Further, when a customer is in a store, and in close proximity to a item that the customer wants to buy, the pricing information available to the customer is limited to the price at the store where the customer is located.

Retailers presently employ methods for targeted advertising of their own items while the customer is in their stores. However, the interest of an advertising retailer is to sell more of their own items. These interests do not enable the customer to compare the retailer's prices with the retailer's competitors' prices for the item the customer wants to buy.

SUMMARY OF THE INVENTION

The illustrative embodiments provide a computer implemented method, apparatus, and computer usable program code for real time pricing of items. A Web service server receives a request to price an item from a mobile client. The Web service server identifies the location of the mobile client. The Web service server queries a set of information sources for pricing information for the item offered by vendors within a selected distance of the identified location of the mobile client. The Web service server sends the result from querying the set of information sources to the mobile client.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
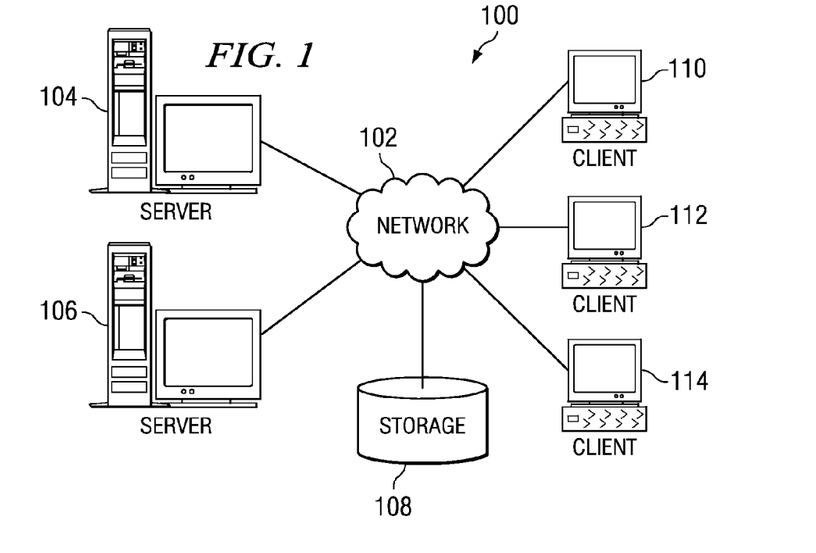
FIG. 1 depicts a pictorial representation of a network of data processing systems in which illustrative embodiments may be implemented.
Figure 2:
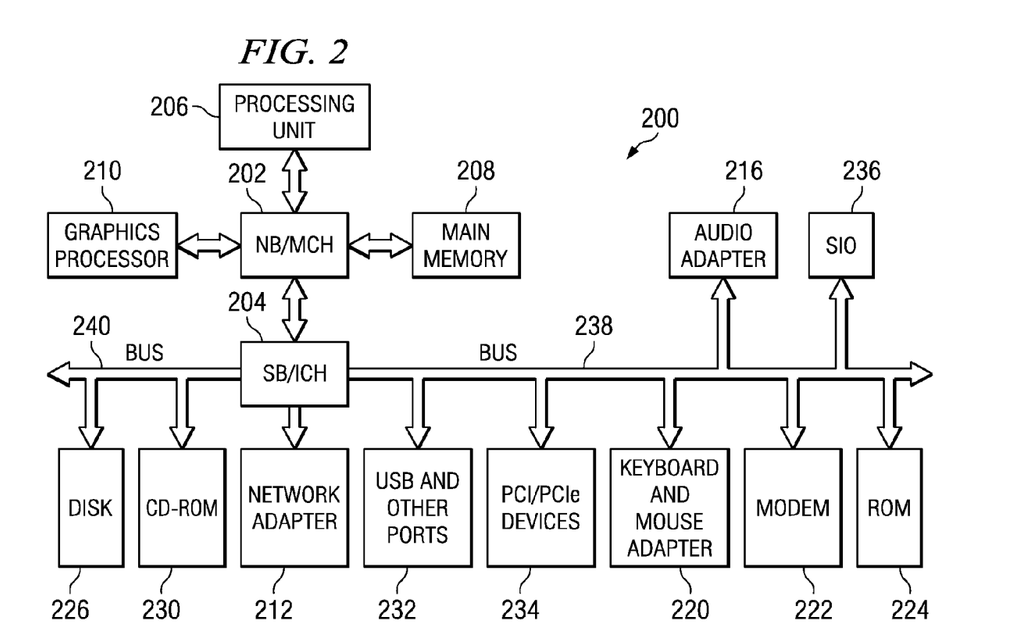
FIG. 2 is a block diagram of a data processing system shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figures 3, 4:
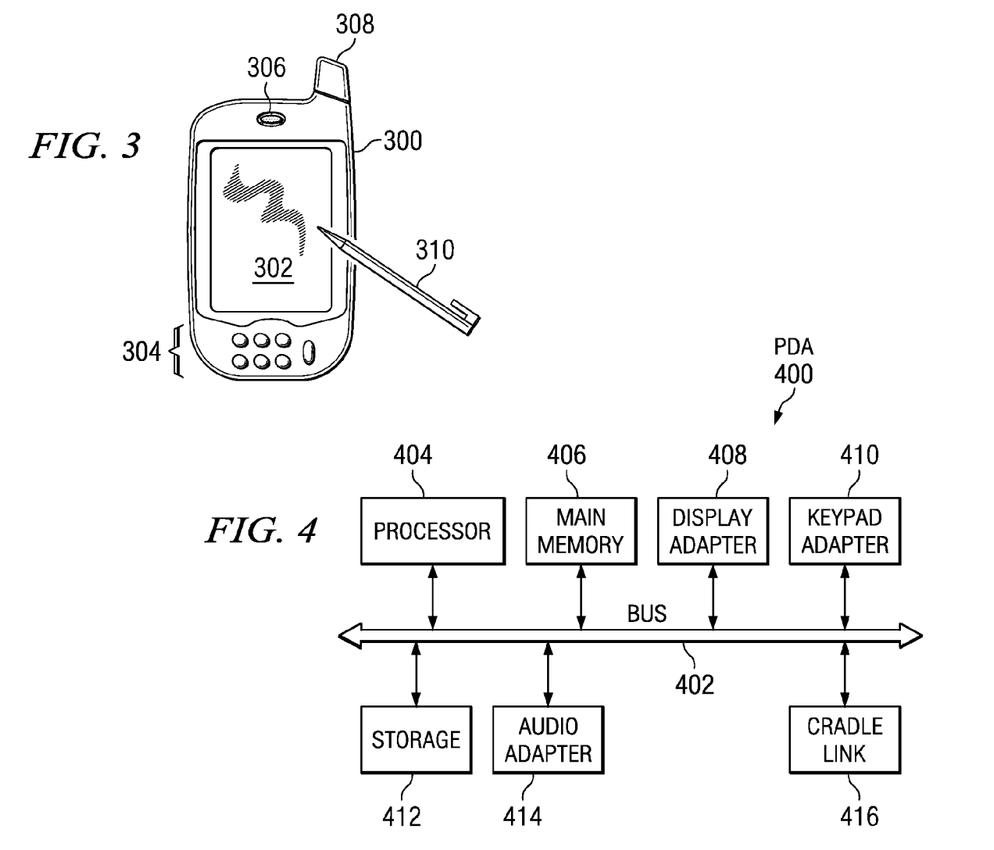
FIG. 3 is a diagram of a client in the form of a personal digital assistant (PDA) in accordance with an illustrative embodiment.
FIG. 4 is a block diagram of a PDA in accordance with an illustrative embodiment.

With reference now to FIG. 3, a diagram of a client in the form of a personal digital assistant (PDA) is depicted in accordance with an illustrative embodiment. PDA 300 includes display 302 for presenting textual and graphical information. Display 302 may be a known display device, such as a liquid crystal display (LCD) device. The display may be used to present a map or directions, calendar information, a telephone directory, or an electronic mail message. In these examples, display 302 may receive user input using an input device such as, for example, stylus 310.

PDA 300 may also include keypad 304, speaker 306, and antenna 308. Keypad 304 may be used to receive user input in addition to using display 302. Speaker 306 provides a mechanism for audio output, such as the presentation of an audio file. Antenna 308 provides a mechanism used in establishing a wireless communications link between PDA 300 and a network, such as network 102 in FIG. 1.

PDA 300 also preferably includes a graphical user interface that may be implemented by means of systems software residing in computer usable media in operation within PDA 300.

Turning now to FIG. 4, a block diagram of a PDA is shown in accordance with an illustrative embodiment. PDA 400 is an example of a PDA, such as PDA 300 in FIG. 3, in which code or instructions implementing the processes of the illustrative embodiments may be located. PDA 400 includes bus 402 to which processor 404 and main memory 406 are connected. Display adapter 408, keypad adapter 410, storage 412, and audio adapter 414 also are connected to bus 402. Cradle link 416 provides a mechanism to connect PDA 400 to a cradle used in synchronizing data in PDA 400 with another data processing system. Further, display adapter 408 also includes a mechanism to receive user input from a stylus when a touch screen display is employed.

An operating system runs on processor 404 and is used to coordinate and provide control of various components within PDA 400. The operating system may be, for example, a commercially available operating system such as Windows CE™, which is available from Microsoft® Corporation. Instructions for the operating system and applications or programs are located on storage devices, such as storage 412 and may be loaded into main memory 406 for execution by processor 404.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4.

A customer, having selected a desired item at a store, often wonders if the price for the item is the best possible price around. An item can be any good or product such as a television set, an automobile, shoes, or a bottle of wine. An item may also be any service, such as oil change for a vehicle, carpet cleaning, HVAC installation, cable TV programming, or wireless phone service.

A retailer or vendor is a person or entity selling goods or services. The retailer or vendor may be a physical store or an online store. Physical stores are also commonly known as brick and mortar stores, as contrasted with online stores that exist purely online. The term online means connected to the Internet. An online store is a store that sells items over the Internet.

Frequently, several competing retailers or vendors may be present near the location of the store where the customer is located. Some competitors may be within acceptable driving distance and may offer a sufficient price difference or other incentives to motivate the customer to drop the item in hand at the present store and drive to a competing store.

The illustrative embodiments recognize that regardless of the availability of printed advertising, online advertising, and online comparison shopping tools, the customer inside the store has no way of readily finding out the prices of the desired item from the various competitors. For example, the advertising is useful towards this purpose when the following two conditions are met. The customer has ready access to the various competitors' advertising materials, and such advertising materials include information about the desired item. Online comparison shopping services are useful in locating items from a large number of retailers to find the price and delivery options to receive the item later at a customer's desired physical location.

The illustrative embodiments recognize several deficiencies in both of these approaches. Neither approach is available or convenient for comparison shopping for a specific item when the customer has the item available at a store and is ready to make the purchase. Neither of these approaches is designed for answering a price search for specific items in which the search takes into consideration the customer's location at the store.

Furthermore, the advertising is geared towards the items the retailer or vendor has on sale and may not contain the item the customer wants to buy. The currently available online comparison shopping tools do not take into consideration the immediate location of the customer. Further, neither approach takes into consideration any limitations that the customer may place on the comparison shopping. One such limitation may be related to the customer's immediate location. For example, the customer may be willing to drive only ten miles from the present store, or the customer may be willing to drive only within a particular suburb or zip code.

The illustrative embodiments provide a computer implemented method, apparatus, and computer usable program code to enable customers to compare prices in real time. Real time pricing is pricing information for one or more items computed and provided to a customer at the time the customer makes the request for price for an item of interest. A request to price an item is a request for pricing information about the item.

With the illustrative embodiments, a customer can be assured that the customer has found the lowest price in the area before making the purchase. Simultaneously, the illustrative embodiments allow a retailer to target a customer who is on the verge of buying an item and has a higher likelihood of making a sale, as opposed to targeting a customer who may be simply price comparing online. In this manner, the store where the customer is located at the time of price comparison, as well as the other stores providing comparable prices, have access to a customer who has decided to buy the item. Therefore, retailers have a much more viable customer for targeted advertising, price matching, or proposing additional relevant items.

The illustrative embodiments further provide customers the ability to purchase from any one of the retailers in real time. Real time purchase of an item means performing the purchase of the item at the time the information usable for purchasing the item is made available to the customer.

The illustrative embodiments provide an Internet-based server with a database. Multiple servers involving a set of more than one database or a distributed database can be used in the illustrative embodiments.

Figure 5:
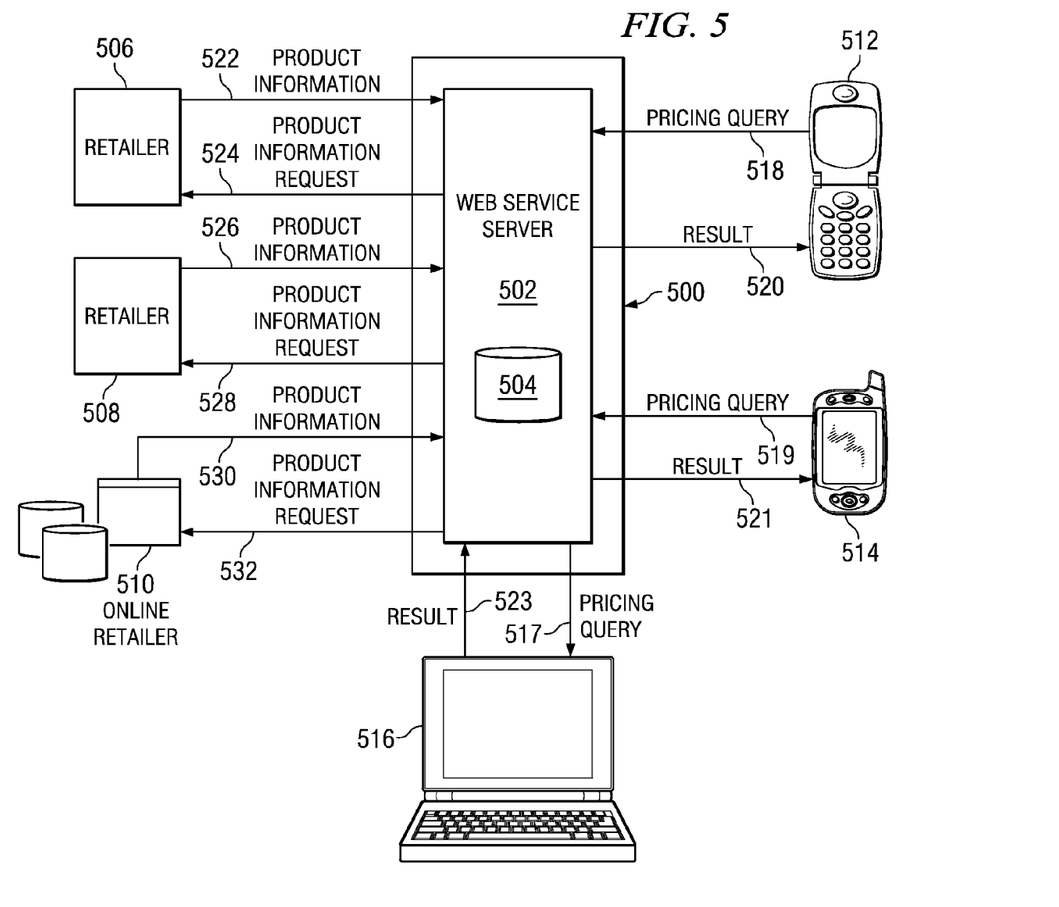
FIG. 5 is a block diagram depicting pricing information flow in accordance with an illustrative embodiment.

With reference now to FIG. 5, pricing information system 500 is depicted in accordance with an illustrative embodiment. Pricing information system 500 includes Web service server 502, which is associated with database 504 and provides pricing information.

Pricing information for an item is information about the item including the price of the item computed using a price specified by a retailer and applying other conditions as identified by the retailer to the price. One such condition can be customer identification information. Customer identification information uniquely identifies a customer to one or more retailers and includes one or more unique pieces of information specific to the customer with respect to those retailers. Customer identification information can be a frequent shopper number associated with the customer, or a customer's credit card number.

Pricing information system 500 may generate two types of pricing in these examples. One type of pricing information is targeted pricing which is pricing specific to the customer and is generated using a customer's customer identification information. The other type of pricing information is location-sensitive pricing. The location-sensitive pricing information is generated based on factors such as, for example, the location of the customer, specific competitors near where the customer may be located, and similar location-related factors.

In these examples, a customer can use any mobile client. A mobile client is a mobile wireless communication device. Mobile devices such as mobile phone 512, personal digital assistant (PDA) 514, and laptop computer 516 are examples of mobile clients that can be used to obtain pricing information. A customer's customer identification information can also be the customer's mobile client's identification, such as phone number of mobile phone 512. A mobile client's identification is a unique identifier associated with a mobile client.

Each of these mobile devices can send a device specific variation of a pricing query to Web service server 502. For example, mobile phone 512 sends pricing query 518, PDA 514 sends equivalent pricing query 519, and laptop 516 sends equivalent pricing query 517.

Pricing query 518 sent from mobile phone 512 is used in illustrative embodiments described herein. Pricing query 518 is a customer request for pricing of a item from other stores. Pricing query 518 is sent from customer's mobile phone 512 and used by Web service server 502 for finding pricing in database 504. Database 504 can be a set of one or more databases, situated locally, remotely, and in a unified or distributed manner. Pricing query 518 contains information about the customer, the desired item, customer's location, and any additional information that retailer 506, retailer 508, and online retailer 510 may require.

In response to receiving a query, such as pricing query 518, Web service server 502 responds to the pricing query with result 520. This result contains the requested pricing information and can be dependent upon the mobile device from which the pricing query originated. For example, result 520 is returned in response to pricing query 518 received from mobile phone 512, result 521 is returned in response to pricing query 519 originating from PDA 514, and result 523 is returned in response to pricing query 517 originating from laptop 516.

Result 520 sent to mobile phone 512 is used in illustrative examples described herein. Result 520 can be a number of prices returned by Web service server 502. Result 520 is the response to pricing query 518 and contains comparative pricing as well as competitive pricing. Comparative pricing is the pricing from various retailers for a specified or comparable item without the benefit of other customer-related factors such as a customer's frequent shopper number. Competitive pricing includes targeted pricing and location-sensitive pricing.

The contents of result of pricing query depend upon the contents of the pricing query, available product information from retailers, and need not contain all types of pricing described above.

Web service server 502 receives and collects product information from a number of retailers or vendors, such as retailers 506 and 508. Product information is information about a product that describes the various characteristics of the product, instructions about the product, condition of the product, and any other information relevant to the production, transportation, sale, use, or disposal of the product. Product information includes pricing information for various products, inventory information, and promotional information. Web service server 502 may also receive similar product information from online retailer 510.

Retailers 506 and 508 may be local physical retailers for desired products in the area specified by the customer. Online retailer 510 provides product information that is also stored and utilized if the customer is interested in waiting for the item to be shipped instead of having the item immediately. Any number of physical retailers and online retailers can provide product information to Web service server 502.

In one illustrative embodiment, Web service server 502 sends product information requests for product information to retailers, who are the information sources for product information. An information source is any source of product information, including pricing information for items. Information sources may be, for example, databases, websites, paper catalogs, or online documents. A set of information sources is one or more information sources.

Product information requests can be retailer dependent and can be specific for each retailer. For example, product information request 524 is sent to retailer 506, who responds with product information 522. Similarly, product information request 528 is sent to retailer 508, who responds with product information 526. Similarly product information request 532 is sent to online retailer 510, who responds with product information 530. Illustrative embodiments are described herein with respect to product information request 524, and corresponding response, product information 522.

The retailers can respond with product information, such as product information 522. Product information 522 is then stored in database 504 and used in creation of result 520 for responding to pricing query 518. The product information need not, but can include competitive rules. Competitive rules are rules defined by a retailer for each item or a subset of items the retailer sells through the Web service server. In the competitive rules, the retailer can define which other retailers they wish to compete against and specify threshold price limits for each item and additional criteria for competitive pricing. For example, retailer 506 may be Circuit City™. Retailer 506 may specify the following criteria for competitive pricing for product identification KDL-40S2000, which is an LCD television manufactured by Sony™. Retailer 506 may specify that the list price is $1,600, and the lowest price or low price threshold is $1,400. Retailer 506 may further specify that a discount of 10 percent applies when the customer is at a Best Buy™ location less than ten miles from the nearest Circuit City™ location. The description of FIG. 12 below explains an illustrative data-structure that may be used for communicating the criteria for competitive pricing.

Figure 6:
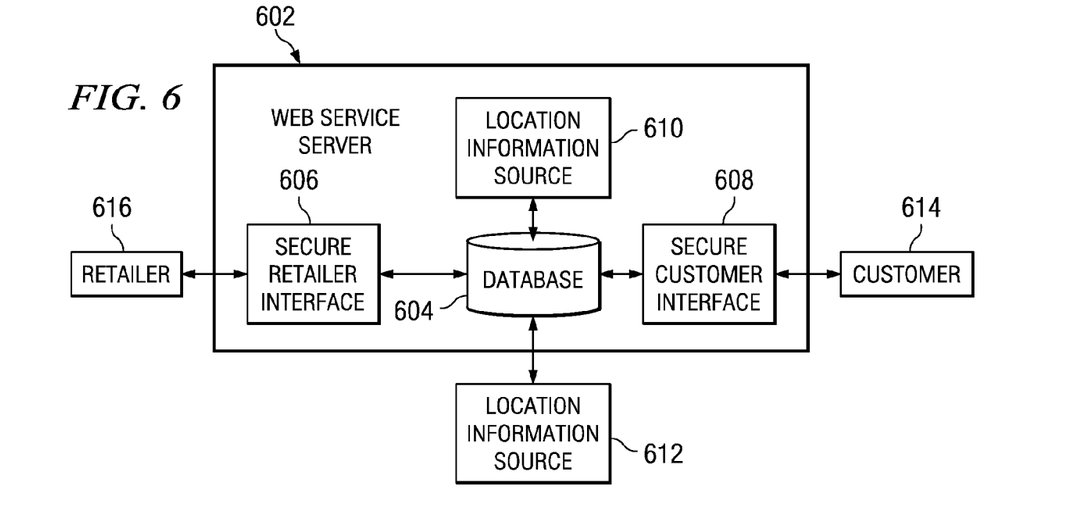
FIG. 6 are Web service server system components in accordance with an illustrative embodiment.

With reference now to FIG. 6, Web service server system components are depicted in accordance with an illustrative embodiment. Web service server 602 contains database 604, secure retailer interface 606, secure customer interface 608, and can optionally contain a mapping and location information source 610. Secure retailer interface 606 is a component used for secured data exchange of product information with retailers such as retailer 616. Similarly, secure customer interface 608 provides a secured interface for secured data exchange with customers such as customer 614. Secured data exchange is the exchange of data between two or more data processing systems, performed in a manner that provides security against undesirable access and manipulation of the data being exchanged. For example, the data exchange may be encrypted using public key encryption to secure the data exchange. As a second example, a data exchange may also be secured by using secured hypertext transport protocol (HTTPS) instead of hypertext transport protocol (HTTP) for Internet based data exchange between a client and a server.

Secure customer interface 608 can be used for receiving a pricing query, such as pricing query 518 in FIG. 5, and for sending results, such as results 520 in FIG. 5. Secure retailer interface 606 and secure customer interface 608 can take the form of a computer hardware implementation, software implementation, a combination of hardware and software implementation, or further in combination with some manual actions.

Secure retailer interface 606, as well as secure customer interface 608, may be implemented such that a singular instance can support secured data exchange with multiple retailers and customers. Alternatively, dedicated secured interfaces for individual retailers and customers may also be implemented. Furthermore, a component providing a secure interface can support unsecured communication through the component if needed. Secure retailer interface 606 and secure customer interface 608 need not reside together with or adjacent to Web service server 602. These components can be distributed and connected to Web service server 602 through communications mechanisms, such as telephony or data networks.

Web service server 602, such as Web service server 502 in FIG. 5, provides result 520 in FIG. 5 based on the customer's identification and location information contained in customer's pricing query 518 in FIG. 5. To resolve and verify the customer's location, the Web service server interacts with location information sources 610 and 612. The location information source can be internal to Web service server 602, such as location information source 610, or can be an external provider, such as location information source 612.

In the illustrative examples, internal and external location information sources need not be mutually exclusive and can be used simultaneously. For example, in one illustrative embodiment, the internal and external location information sources may provide location information in different regions. The internal source may provide location information for zip codes beginning with zero through five, and the external source may provide location information for zip codes beginning with six through nine.

Furthermore, Web service server 602 can receive requests from customers located outside of the United States. In a second illustrative embodiment, the workload of resolving customers' locations may be divided between internal and external location information sources along the national or state boundaries.

These illustrative examples and depictions in FIG. 6 are not intended to limit the manner in which the illustrative embodiments may be implemented. For example, more than one of each of the internal and external location information sources can be utilized. Each of these location information sources can use any available methods for resolving and verifying a customer's location, for example, GPS signals, triangulation, street address, last known location from wireless communication systems, and any other means for verifying location of the customer.

Figure 7A:
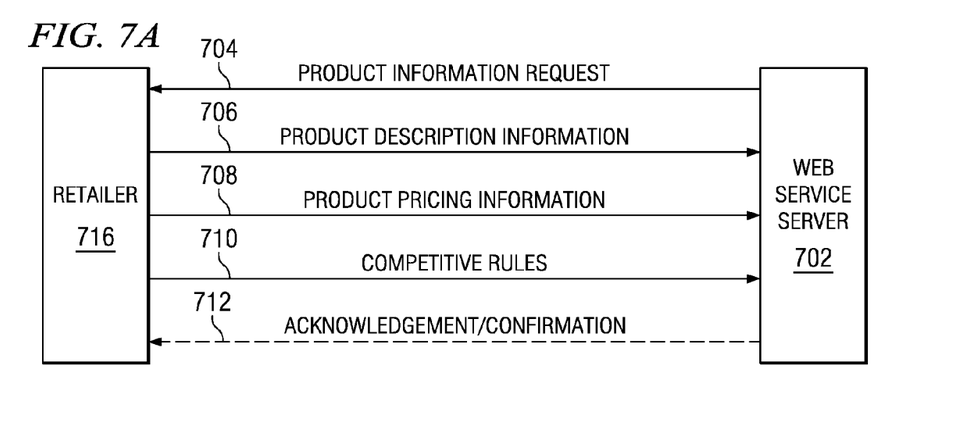
FIG. 7A is an exemplary sequence of data transactions between the Web service server and a retailer in a dataflow diagram in accordance with an illustrative embodiment.

With reference now to FIG. 7A, a dataflow diagram of an data transactions between Web service server 702 and retailer 716 is depicted in accordance with an illustrative embodiment. Web service server 702 exchanges product information request 704, product description information 706, product pricing information 708, competitive rules 710, and acknowledgement/confirmation 712 with retailer 716, retailer 716 being the same as any one of retailers 506, 508, or online retailer 510 in FIG. 5. FIG. 7A illustrates one method of receiving product information data from a retailer into the Web service server. Other sequences of data transactions are conceivable for achieving the same result.

More specifically, FIG. 7A illustrates a "pull" transaction between Web service server 702 and retailer 716. In a pull transaction for information, Web service server 702 initiates product information request 704 from retailer 716. In response, retailer 716 sends back product description information 706, product pricing information 708, and competitive rules 710 for the various items retailer 716 wishes to sell using Web service server 702. Product description information 706, product pricing information 708, and competitive rules 710, sent by retailer 716, form product information together, such as product information 522 in FIG. 5.

In a pull transaction, Web service server 702 determines when product information request 704 is to be sent. The schedule for pulling the product information can be completely self determined by Web service server 702 or can be specifically requested by retailer 716. Web service server 702 can use the pull transaction to receive new product information or an update to product information existing in a Web service server database, such as database 504 in FIG. 5.

Figure 7B:
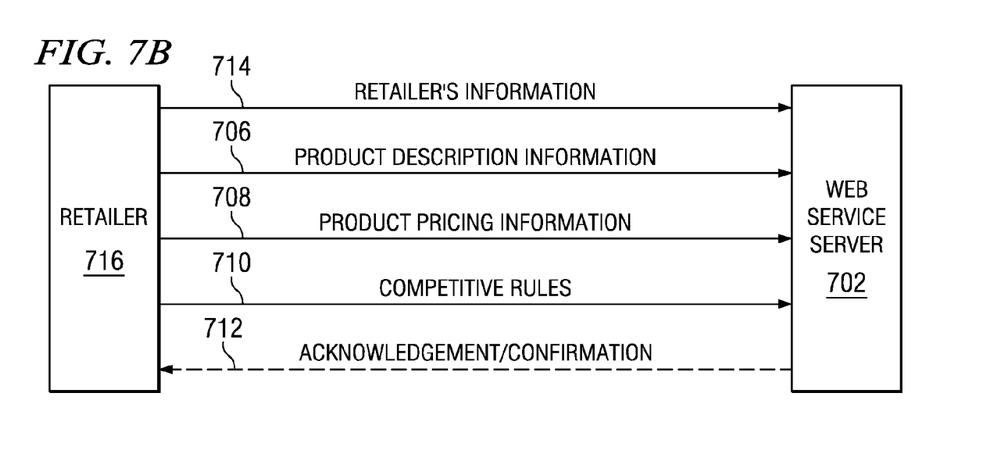
FIG. 7B is a second exemplary sequence of data transactions between the Web service server and a retailer in a dataflow diagram in accordance with an illustrative embodiment.

With reference now to FIG. 7B, a second dataflow diagram of data transactions between Web service server 702 and retailer 716 is depicted in accordance with an illustrative embodiment. FIG. 7B illustrates a second method of receiving product information data into Web service server 702 from retailer 716. Other sequences of data transactions are conceivable for achieving the same result.

FIG. 7B illustrates a "push" transaction between a Web service server and a retailer. In a push transaction for information, retailer 716 initiates the transaction by sending retailer's information 714 to Web service server 702. Following retailer's information 714, retailer 716 sends product description information 706, product pricing information 708, and competitive rules 710 for the various items retailer 716 wishes to sell using Web service server 702. In a push transaction, retailer 716 determines when retailer's information 714, product description information 706, product pricing information 708, and competitive rules 710 are to be sent. Retailer 716 can use the push transaction for sending new product information or an update to product information existing in a Web service server database, such as database 504 in FIG. 5.

Figure 7C:
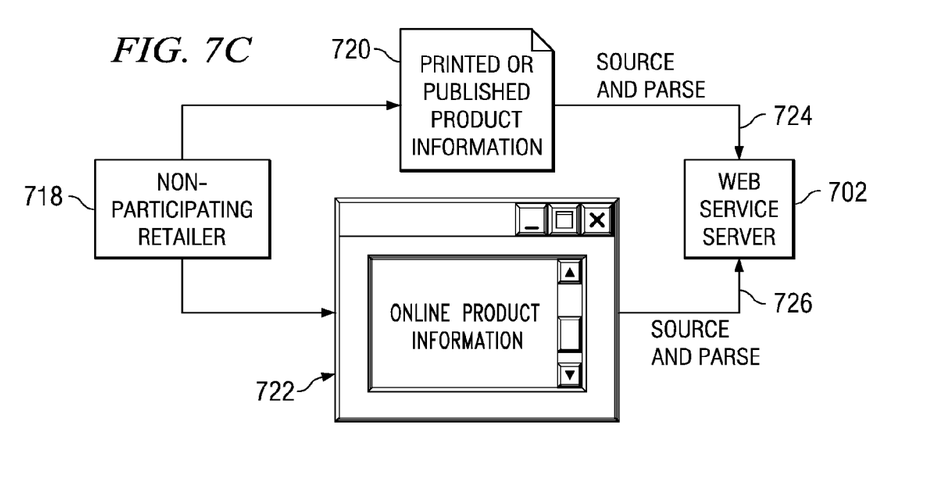
FIG. 7C is a third exemplary sequence of data transactions between the Web service server and a retailer in a dataflow diagram in accordance with an illustrative embodiment.

With reference now to FIG. 7C, a third dataflow diagram of data transactions between Web service server 702 and non-participating retailer 718 is depicted in accordance with an illustrative embodiment. FIG. 7C illustrates a third method of receiving the product information data into the Web service server from a retailer. Other sequences of data transactions are conceivable for achieving the same result. FIG. 7C illustrates a "parse" transaction between Web service server 702, such as Web service server 502 in FIG. 5, and retailer 718, such as retailer 506, 508, or online retailer 510 in FIG. 5.

Not all retailers may choose to participate in the pricing system disclosed in these examples. Public information about a non-participating retailer's items, pricing, and inventory may nonetheless be available from other sources. Public information may be available in the form of printed or published product information 720 or online product information 722. Sources of available information may be, for example, print media advertising, on-air advertising, online advertising, online stores, third-party printing, and online catalogs.

In these examples, sourcing means identifying and using a specific source of information. Parsing means breaking down the information from the source selected. Sourcing and parsing means the total activity of identifying a source of information, using the identified source to get the information, and breaking down the information from the identified source into usable fragments of data. Sourcing and parsing available information is source dependent. For example, printed product information, such as printed or published product information 720 may be sourced and parsed 724 one way, and online product information 722 may be sourced and parsed 726 a different way.

Further, two different printed publications can be parsed differently from one another, for example, based on the print layout. The same is true for various online information. They too can be different in the manner of access and layout.

In these examples, a parse transaction means a transaction in which Web service server receives information by using source and parse method as described above. In a parse transaction for product information, Web service server 702 sources and parses 724 available printed or published product information 720 into database, such as database 504 in FIG. 5. Alternatively or conjunctively, Web service server 702 can also source and parse 726 available online product information.

In a parse transaction, Web service server 702 determines when printed or published product information 720 and online product information 722 has to be sourced and parsed. Web service server 702 can use the parse transaction for receiving new product information or an update to product information existing in Web service server database 504 in FIG. 5. In these examples, the Web service server is responsible for managing the expiration and updates for the data collected. The operators of the Web service server and a non-participating retailer may have separately negotiated financial arrangements for utilizing printed or published product information 720 and online product information 722 in this manner and any sales resulting from non-participating retailer 718.

Additional data transfer can occur in each type of data transaction depicted in FIGS. 7A-7C. An implementation can include communication of acknowledgement/confirmation 712 from a Web service server to a retailer after any information sent by the retailer is received. Likewise, a retailer can send acknowledgment/confirmation 712 upon receipt of information sent by a Web service server.

Figure 7D:
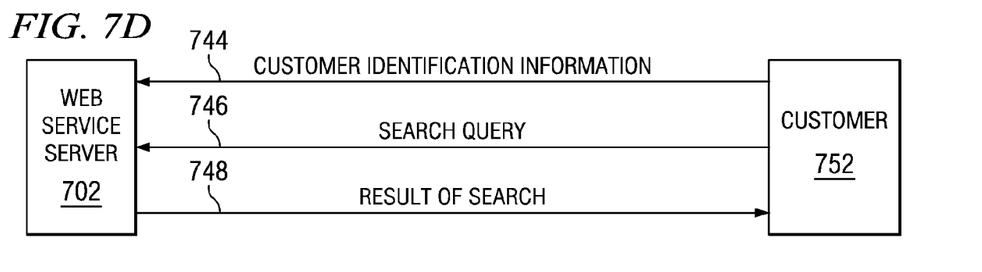
FIG. 7D is an exemplary sequence of data transactions between a customer and a Web service server in a dataflow diagram in accordance with an illustrative embodiment.

With reference now to FIG. 7D, a dataflow diagram of data transactions between customer 752 and Web service server 702 is depicted in accordance with an illustrative embodiment. Web service server 702 exchanges customer identification information 744, search query 746, and result of search 748 with customer 752. Customer 752, such as customer 614 in FIG. 6, can use a mobile device, such as mobile phone 512, PDA 514, and laptop 516 in FIG. 5. FIG. 7D illustrates one method by which customer 752 can receive the result of a pricing query, such as result 520 in FIG. 5, including pricing information from Web service server 702. Other sequences of data transactions are conceivable for achieving the same result.

FIG. 7D illustrates a pricing query transaction between customer 752 and Web service server 702. Customer 752 initiates a pricing query, such as pricing query 518 in FIG. 5, by sending customer identification information 744 to Web service server 702, followed by search query 746. Search query 746 includes identification of the desired product and customer's location. The product identification may be a product code, such as the product's Uniform Product Code (UPC) or Radio Frequency Identification Code (RFID), keywords descriptive of the product, or something as simple as the name of the product or the manufacturer.

A customer's location is the location of the customer's mobile client, such as mobile phone 512 in FIG. 5, and can be generated from a GPS signal, can be triangulated, or otherwise determined by a third party. A customer's location can also be something as simple as the street address of the retailer where the customer is located at that time. The customer can specify selected distances, zip codes, names of suburban areas, or similar restrictions within which to limit the search results.

Web service server 702 processes the pricing query and returns the result, such as result 520 in FIG. 5, generated based on the identified product, customer's identity, and the customer's location. Other parameters may be utilized by the Web service server in the computation of the result, such as day of the week or date of the month that affects inventory, product pricing, or a competitive rule.

Customers may select a particular retailer from a result, such as result 520 in FIG. 5, and choose to buy from that retailer in real time. Note that Web service server 702 can send additional information to a customer to enable the purchase from the result in real time. In such cases, the embodiments may be implemented in at least two different ways as depicted in FIGS. 7E-7F.

Figure 7E:
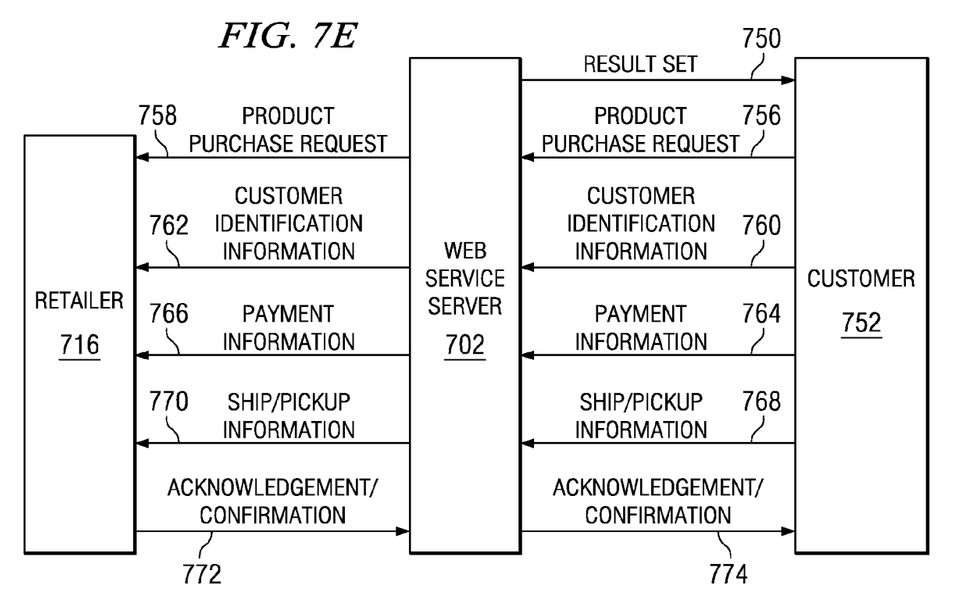
FIG. 7E is an exemplary sequence of data transactions between a customer, a Web service server, and a retailer in a dataflow diagram in accordance with an illustrative embodiment.
Figure 7F:
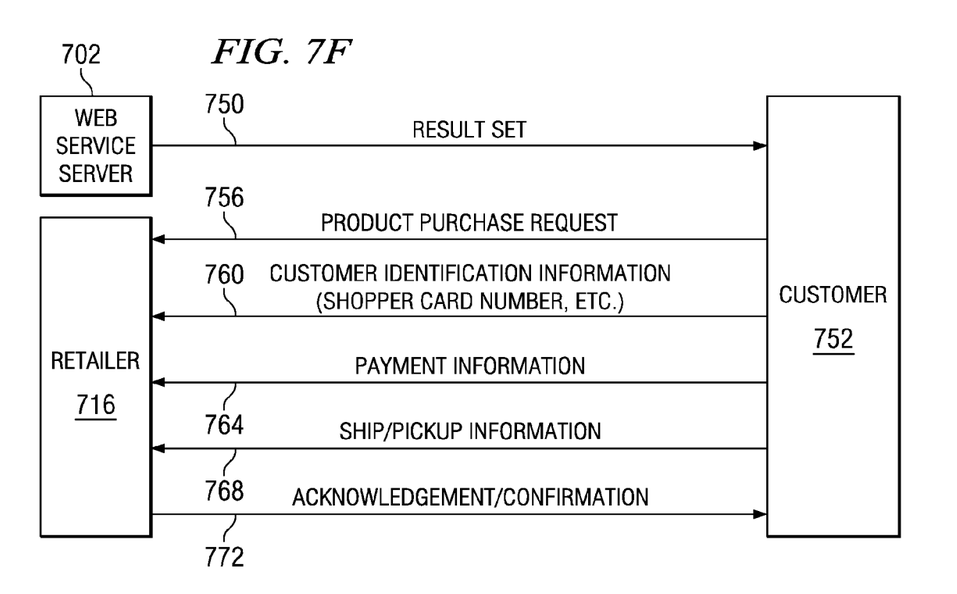
FIG. 7F is a second exemplary sequence of data transactions between a customer, a Web service server, and a retailer in a dataflow diagram in accordance with an illustrative embodiment.

With reference now to FIG. 7E, an exemplary sequence of data transactions between customer 752, Web service server 702, and retailer 716 is depicted in a dataflow diagram in accordance with an illustrative embodiment. FIG. 7E illustrates one method by which customer 752 can purchase an item in real time from the result of a pricing query, such as result 520 in FIG. 5. Other sequences of data transactions are conceivable for achieving the same result.

FIG. 7E illustrates a purchase transaction between customer 752 and retailer 716 through Web service server 702. Web service server 702 sends result 750, such as result 520 in FIG. 5, to customer 752. Customer 752 sends product purchase request 756 to Web service server 702. Web service server 702 sends corresponding product purchase request 758 to retailer 716.

Next, customer 752 sends customer identification information 760, payment information 764, and ship/pick-up information 768 to Web service server 702. Web service server 702 sends corresponding customer identification information 762, payment information 766, and ship/pick-up information 770 to retailer 716. Retailer 716 communicates acknowledgement/confirmation 772 of sale to Web service server 702, which communicates corresponding acknowledgement/confirmation 774 to the customer. Web service server 702 acts as a broker between customer 752 and retailer 716 so that the customer's experience can be uniform across the range of retailers.

With reference now to FIG. 7F, a second dataflow diagram of data transactions between customer 752, Web service server 702, and retailer 716 is depicted in a dataflow diagram in accordance with an illustrative embodiment. FIG. 7F illustrates a second method by which customer 752 can purchase an item in real time from the result of a pricing query, such as result 520 in FIG. 5. Other sequences of data transactions are conceivable for achieving the same result.

FIG. 7F illustrates a purchase transaction between customer 752 and retailer 716 without passing through Web service server 702. Web service server 702 sends result 750, such as result 520 in FIG. 5 to customer 752. Customer 752 sends product purchase request 756 to retailer 716.

Next, customer 752 sends customer identification information 760, payment information 764, and ship/pick-up information 768 to retailer 716. Acknowledgment/confirmation 772 of sale is communicated to customer 752. Web service server 702 does not act as a broker between customer 752 and retailer 716 for the purchase transaction. The retailer can support the customer purchase process as the retailer sees fit.

In addition to data transactions described in FIGS. 7A-7F, other commonly used methods for populating a database with product information and purchasing an item from an electronic selection can be used in conjunction with the illustrative embodiments. The examples illustrate making competitive pricing available to a customer at a retail location. This competitive pricing is provided to the customers in real time, by taking into consideration the customer's location at a retailer, in a manner that is not currently available.

Figure 8A:
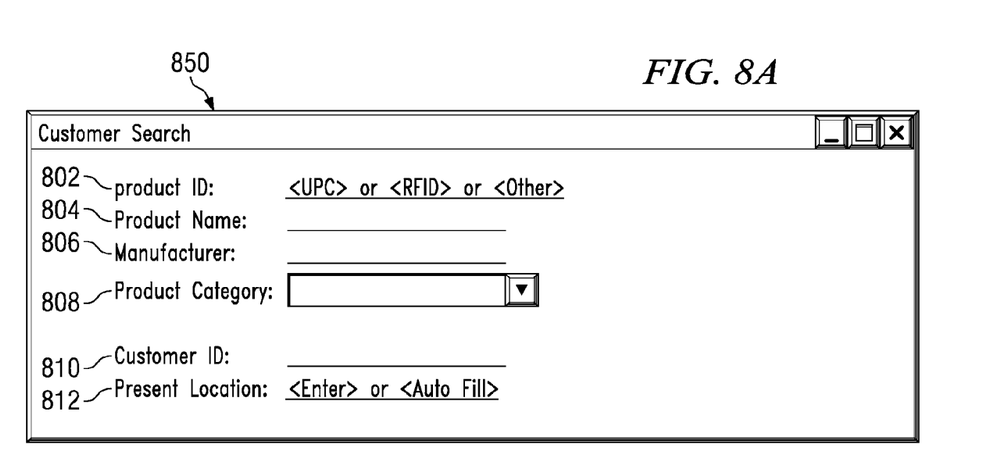
FIG. 8A is an exemplary screen layout of the customer's pricing search screen in accordance with an illustrative embodiment.

With reference now to FIG. 8A, an exemplary screen layout of the customer's pricing search screen is depicted in accordance with an illustrative embodiment. Screen layout 800 includes data fields that are used for entering information about the item of interest, customer identification information, and the present location information.

The customer identification information is used for providing targeted pricing. Targeted pricing is pricing specifically generated for the specific customer. Location information is used for providing location-sensitive pricing. Location-sensitive pricing is pricing that depends on the current location of the customer, such as whether the customer is presently at a competing store or a non-competing store.

As described above, product identification can be the item's uniform product code (UPC) or radio frequency identification code (RFID) input by the customer on Product ID data field 802. The product identification can also be something as simple as the product name or the manufacturer, input in data fields 804 and 806 respectively. The customer can additionally provide a category of the item in data field 808 to further narrow the search.

Customer identification information, such as a frequent shopper card number, a credit card number, or other identifier is input in data field 810. A customer's location is input in data field 812. The location information is the location of the customer's mobile client and can be generated and auto-populated from a GPS signal, can be triangulated, or otherwise determined from a third-party source. The location information can be something as simple as the street address of the retailer where the customer is located at that time, and input by the customer. The customer can additionally specify selected distances, zip codes, names of suburban areas, or similar restrictions within which to limit the search results. Additional information may be captured in additional ways and the screen layout may be varied.

Figure 8B:
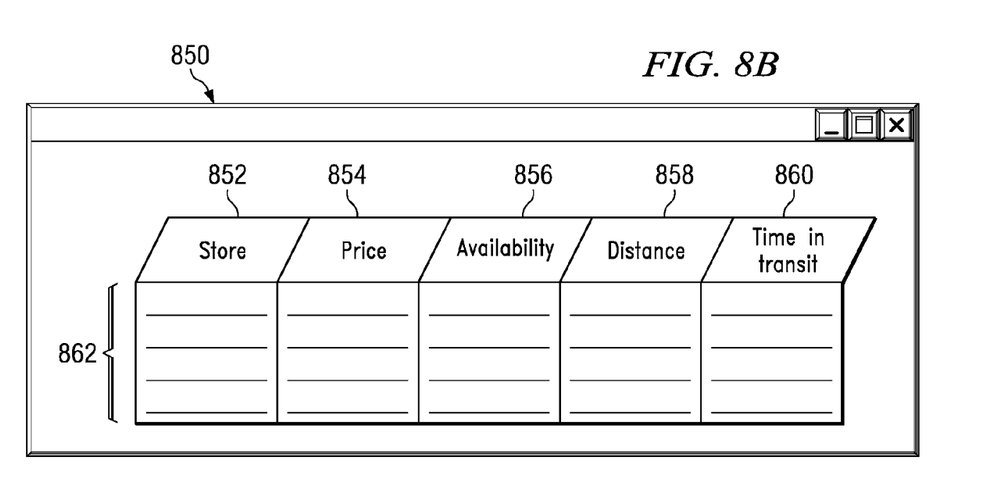
FIG. 8B is an exemplary screen layout of the screen displaying the result for the customer's pricing query in accordance with an illustrative embodiment.

With reference now to FIG. 8B, an exemplary screen layout of the screen displaying the result for the customer's pricing query is depicted in accordance with an illustrative embodiment. Screen layout 850 includes data fields that are used for displaying pricing information about the item of interest in the result returned by Web service server 702 in FIG. 7.

The result includes one or more rows 862 of data that include the following data columns in some order or combination. For each row 862, data column 852 contains store identifying information about the retailer who provided the information in that particular row 862. Column 854 contains the price for the item offered by the retailer in column 852 of specific row 862.

A retailer may provide product information about a item that is different from the exact item requested by the customer but comparable to the requested item. Such replacement product information may be supplied by a retailer as a substitute for, or in addition to, the information about the requested item.

Column 856 shows available quantities at the retailer. Similarly, column 858 shows distance of the retailer in column 852 from the customer's location supplied in data field 812 in FIG. 8A. Column 860 displays estimated time in transit from the customer's location to the retailer's location.

Screen layouts 800 in FIGS. 8A and 850 in FIG. 8B are not intended to be limitations on the manner in which the illustrative embodiments may be implemented. For instance, on screen layout 850, not all columns 852-860 necessarily contain data for each row 862. Additional columns of information may be displayed without affecting the novel aspects.

Similarly, more or less information can be collected on screen layout 800 for building the pricing query. Alternatively, screen layout 800 may be eliminated if the pricing query is built completely using product identification, customer information, and location information that is stored, automatically collected, or entered by other means such as imaging, speech, and point-and-click.

Figure 9:
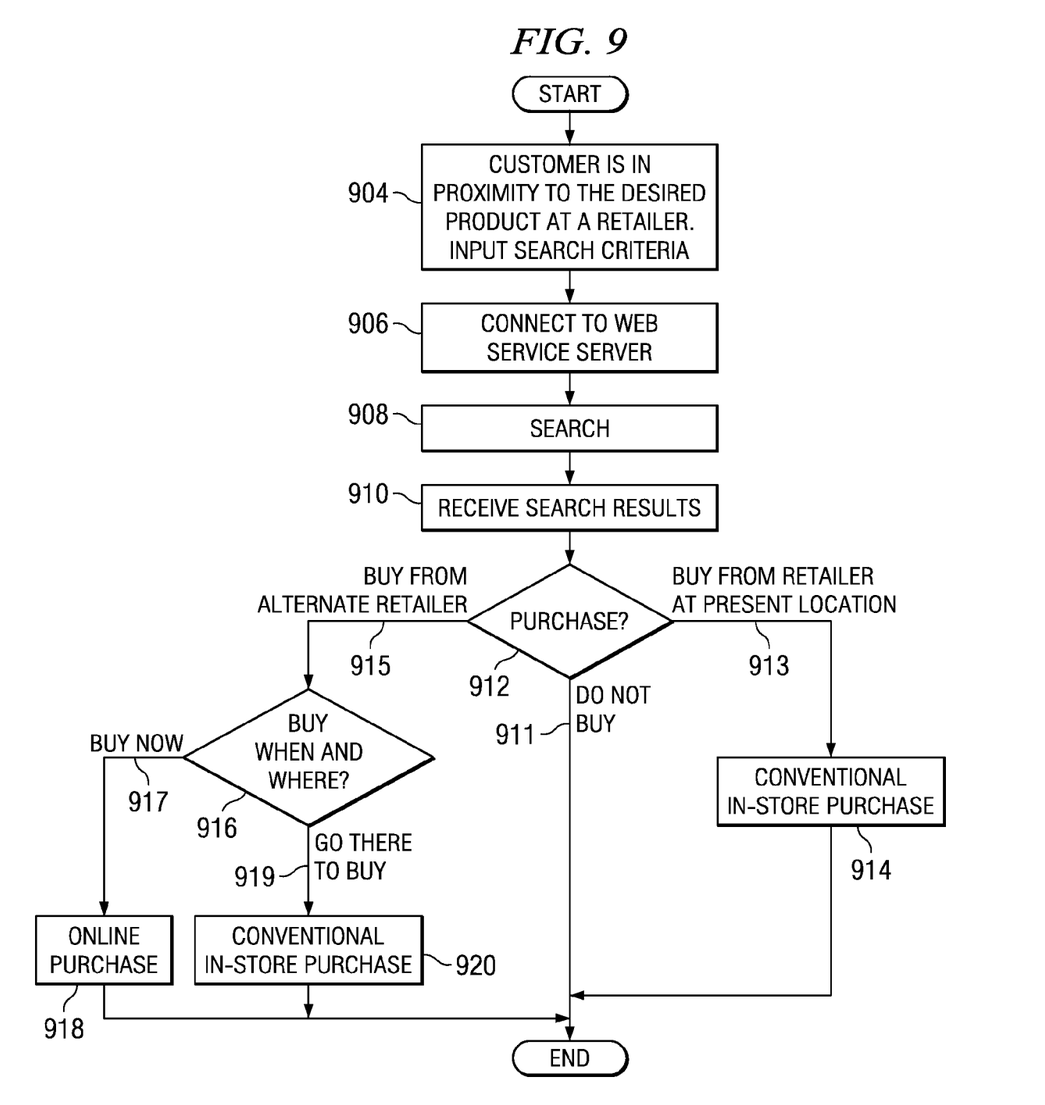
FIG. 9 is a flowchart illustrating a process for receiving pricing by a customer located in a retail environment in accordance with an illustrative embodiment.

With reference now to FIG. 9, a flowchart illustrating a process for receiving pricing by a customer located in a retail environment is depicted in accordance with an illustrative embodiment. The steps illustrated in FIG. 9 may be implemented in a mobile client, such as mobile phone 512 in FIG. 5.

The process begins with the customer going to a retail location and finding an item of interest. The process receives search criteria for a pricing query for the item (step 904). In these examples, in step 904, the pricing query is received on a screen, such as screen layout 800 in FIG. 8A on a mobile client. The mobile client can be a mobile phone, such as mobile phone 512 in FIG. 5.

The search criteria for pricing form a search query such as search query 746 in FIG. 7D. Search query includes identification of the desired item and customer's location.

The product identification can be a product code, such as the item's uniform product code or radio frequency identification code, keywords descriptive of the item, or something as simple as the name of the product or the manufacturer.

A customer's location can be generated from a GPS signal, can be triangulated, or otherwise determined by a third party. A customer's location also can be something as simple as the street address of the retailer where the customer is located at that time.

The customer can specify selected distances, zip codes, names of suburban areas, or similar restrictions within which to limit the search results.

The mobile client then connects to the Web service server (step 906). The mobile client then submits the query to the Web service server, such as Web service server 502 in FIG. 5 (step 908). Once a result has been generated by the Web service server, the mobile client receives the result containing competitive pricing for the item (step 910). Note that the result can include items comparable to the item in the query.

The result is displayed to the customer using a screen layout on the mobile client, such as screen layout 850 in FIG. 8B.

From the result thus received, the customer makes a decision as to whether to buy from the retailer at the present location or from one of the other retailers shown in the result (step 912). If the customer decides to buy at the present retailer ("buy from retailer at present location" path 913), the customer performs a conventional in-store purchase (step 914). The process terminates thereafter. If the customer decides not to buy from the present retailer or any of the retailers from the result ("do not buy" path 911), the process also terminates.

Alternatively, if the customer decides to buy from one of the retailers from the result ("buy from alternate retailer" path 915), the customer decides when and where to buy the item (step 916). If the customer decides to buy in real time from an online retailer shown on the result ("buy now" path 917), the customer performs an online purchase using the mobile client, and the process terminates (step 918). If the customer decides to go to an alternate retailer shown on the result ("go there to buy" path 919), the customer visits the alternate retailer's location and performs a conventional in-store purchase (step 920). The process terminates thereafter.

Figure 10:
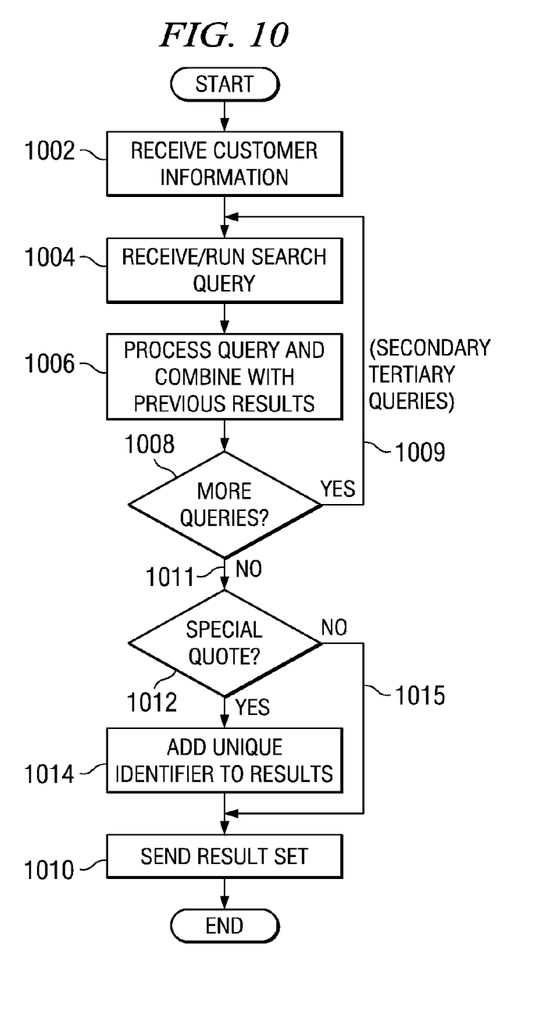
FIG. 10 is a flowchart illustrating a process for processing a pricing query by the Web service server in accordance with an illustrative embodiment.

With reference now to FIG. 10, a flowchart illustrating the steps of the process for processing a pricing query by the Web service server is depicted in accordance with an illustrative embodiment. The process can be implemented in a Web service server, such as Web service server 502 in FIG. 5.

The process begins by receiving the customer identification information from a mobile client, such as mobile phone 512 in FIG. 5 (step 1002). In the illustrative examples, this information serves two purposes. First, the customer identification information allows the Web service server the opportunity to validate and authenticate a customer and determine if the customer is a valid subscriber to the Web service server offering. Step 1002 may not be necessary if the Web service server offers a free service to everyone. Second, the customer identification information allows the Web service server to return any targeted pricing that is dependent upon the customer's identity.

The Web service server next receives the pricing query (step 1004). In step 1004, the pricing query has multiple parts from the mobile client. A pricing query submitted by a mobile client can contain all of the following: exact or general product identification and exact or general present location of the customer. In addition, customer identification information is also available from step 1002 for Web service server to use in processing the pricing query.

As a result, multiple results may be generated by the Web service server and combined to create the final result for sending to the mobile client. Information received in steps 1002 and 1004 can be combined in a single transmission or transmitted separately from the mobile client in alternate embodiments.

Next, the Web service server processes the query based on the product identification and generates a result. The result includes information from various retailers offering the identified item or similar items (step 1006). Then, based on customer identification information from step 1002, the Web service server determines if customer-specific pricing is offered by any of the retailers (step 1008). If customer identification information is present, a secondary search is performed to find customer specific targeted pricing ("yes" path 1009). The Web service server runs secondary search and generates results of the secondary search (step 1004). Results of the secondary search are combined with the previously generated results (step 1006).

Next, the Web service server checks to see if location information is present in the customer's query. If location information is present, the Web service server determines if any retailers in the database have competitive rules for offering competitive pricing in and around that customer's location. If such competitive rules are present, a tertiary search is performed to find location-sensitive pricing ("yes" path 1009). The Web service server runs tertiary search and generates results of the tertiary search (step 1004). Results of the tertiary search are combined with the previously generated results (step 1006).

If no other searches can be performed based on the customer supplied information, ("no" path 1011), the Web service server determines if the cumulative results contain any "special quotes" (step 1012). If any special quotes are present, ("yes" path 1013) a special quote number is added to the cumulative results (step 1014). The result, including cumulative results, any quote numbers, and any additional information, such as advertising, is sent to the mobile client (step 1010). The process terminates thereafter.

If a special quote is not contained in the cumulative results ("no" path 1015), the result including cumulative results and any additional information is sent to the mobile client (step 1010). The process terminates thereafter.

Various components of the pricing query may be processed in any order by the Web service server. The order depicted in FIG. 10 is only intended to be an illustrative example and not limiting as to how the embodiments may be implemented.

Figure 11:
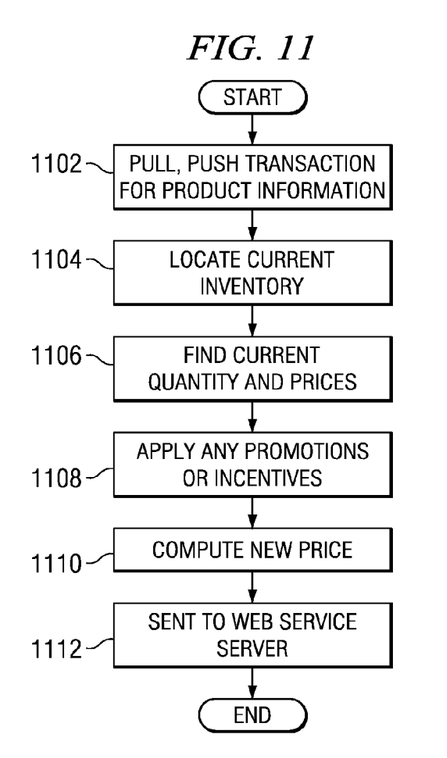
FIG. 11 is a flowchart illustrating a process for sending the product information by a retailer to the Web service server in accordance with an illustrative embodiment.

With reference now to FIG. 11, a flowchart illustrating the steps of the process for sending the product information by a retailer to the Web service server is depicted in accordance with an illustrative embodiment.

The process proceeds with the retailer, such as retailer 506 in FIG. 5, receiving a pull transaction request for product information from the Web service server (step 1102). Web service server can be the Web service server 502 in FIG. 5. Alternatively, the retailer can push the product information to the Web service server (step 1102).

The retailer locates the current inventory of products the retailer wishes to sell through the Web service server (step 1104). The retailer establishes the currently available inventory and pricing for products that the retailer wishes to sell through Web service server (step 1106). The retailer then applies any current promotions and/or discounts that the retailer chooses to offer (step 1108). The retailer revises the quantities and pricing to be included in the product information (step 1110). The retailer then sends the product information to the Web service server (step 1112). The process terminates thereafter.

Figure 12:
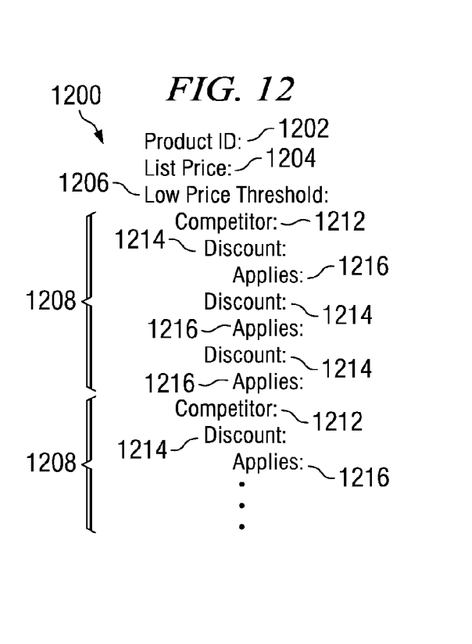
FIG. 12 is a data structure listing criteria that can be used for defining the competitive rules by a retailer depicted in accordance with an illustrative embodiment.

With reference now to FIG. 12, an illustrative data structure listing criteria that may be used for defining the competitive rules by a retailer, such as retailer 716 in FIG. 7A, is depicted in accordance with an illustrative embodiment.

In competitive rule 1200, the retailer specifies product identification 1202 to which the competitive rule apply. Competitive rule 1200 includes list price 1204 of the product and lowest price 1206 at which to sell the product. Retailer then specifies in sub-data-structure 1208 specific competitive criteria for each competitor 1212, such as what discount 1214 and when the discount would apply 1216. For example, retailer Circuit City™ may specify that for product identification 1202 KDL-40S2000 which is an LCD television manufactured by Sony™, list price 1204 is $1,600, lowest price or low price threshold 1206 is $1,400, and for competitor 1212 Best Buy™, discount 1214 is 10 percent which applies 1216 when the customer is at a Best Buy™ location less than ten miles from the nearest Circuit City™ location.

Any number of sub-data-structures 1208 can be specified, and within each sub-data-structure 1208, any number of discount applies 1214-1216 pairs can be present for each competitor 1212.

Thus, the illustrative embodiments provide a computer implemented method, apparatus, and computer usable program code for real time pricing of items. A customer is able to get pricing information on items of interest from a retail location where the customer is present at a particular time. The customer receives pricing from competing retailer within a selected distance for items of interest and comparable items. The illustrative embodiments further provide the customer the ability to purchase an item from the result of the pricing query in real time.

A Web service server uses a set of databases to process the pricing query and generate the results. The illustrative embodiments provide several exemplary methods for populating the database with product information from several retailers. The Web service server computes the pricing information based on the customer's identification, customer's location and product information for the item requested.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

What is claimed is:

1. A computer implemented method for real time pricing of items, the computer implemented method comprising:

responsive to receiving a request to price an item from a mobile client, identifying a physical location of the mobile client to form an identified location;

querying by a data processing system a set of information sources for pricing information for the item offered by vendors physically located within a selected distance of the identified location, wherein each vendor sets a vendor-specific price for the item to be provided to the mobile client, and wherein a particular one of the vendors has specified a subset of other ones of the vendors that the particular one of the vendors wants to compete against by offering a lower price for the item than the vendor-specific price set by the other ones of the vendors when the mobile client is physically located in one of the other ones of the vendors when the mobile client performs the querying step; and responsive to receiving a result from querying the set of information sources, sending the result to the mobile client.

2. The computer implemented method of claim 1, further comprising:

collecting from at least one information source, product information comprising at least one of inventory information, pricing information, competitive rules, and promotional information; and storing the product information in the set of information sources, wherein the product information is used for producing the result from querying the set of information sources.

3. The computer implemented method of claim 2, wherein collecting the product information is a secured data exchange.

4. The computer implemented method of claim 2, wherein the collecting step is one of pulling information from the information sources, receiving pushed information from the information sources, and sourcing and parsing available information.

5. The computer implemented method of claim 2, wherein the querying step comprises applying competitive rules provided by the at least one information source to the mobile client's request.

6. The computer implemented method of claim 1, wherein receiving the request from the mobile client, and sending the result to the mobile client are secured data exchanges.

7. The computer implemented method of claim 1, further comprising:

sending information to enable real time purchase of the item by selecting a vendor from the result.

8. The computer implemented method of claim 1, further comprising:

verifying the identified location.

9. The computer implemented method of claim 1, wherein the request to price the item contains at least one of product code, product identification, and one or more keywords describing the item.

10. The computer implemented method of claim 1, wherein the request to price the item contains mobile client's identification, the identified location and the mobile client's identification together forming the mobile client's information, and the mobile client's information is used for providing the result.

11. The computer implemented method of claim 10, wherein the result comprises special quotes based on the mobile client's information.

12. The computer implemented method of claim 1, wherein the querying step comprises information about items comparable to the item in the mobile client's request.

13. The computer implemented method of claim 1, wherein the particular one of the vendors has specified a threshold price limit for the item that is the lowest price for which the particular one of the vendors will sell the item.

14. The computer implemented method of claim 1, wherein the lower price for the item offered by the particular one of the vendors is determined using a discount percentage.

15. The computer implemented method of claim 1, wherein the lower price for the item is offered by the particular one of the vendors when the mobile client is physically located in one of the other ones of the vendors, which is located within a particular distance from the particular one of the vendors when the mobile client performs the querying step.

* * * * *

UNITED STATES PATENT AND TRADEMARK OFFICE
CERTIFICATE OF CORRECTION

| | | |
|---|---|---|
| PATENT NO. | : 7,653,576 B2 | Page 1 of 1 |
| APPLICATION NO. | : 11/461474 | |
| DATED | : January 26, 2010 | |
| INVENTOR(S) | : Boss et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 356 days.

Signed and Sealed this

Twenty-third Day of November, 2010

David J. Kappos
*Director of the United States Patent and Trademark Office*